UNITED STATES PATENT OFFICE.

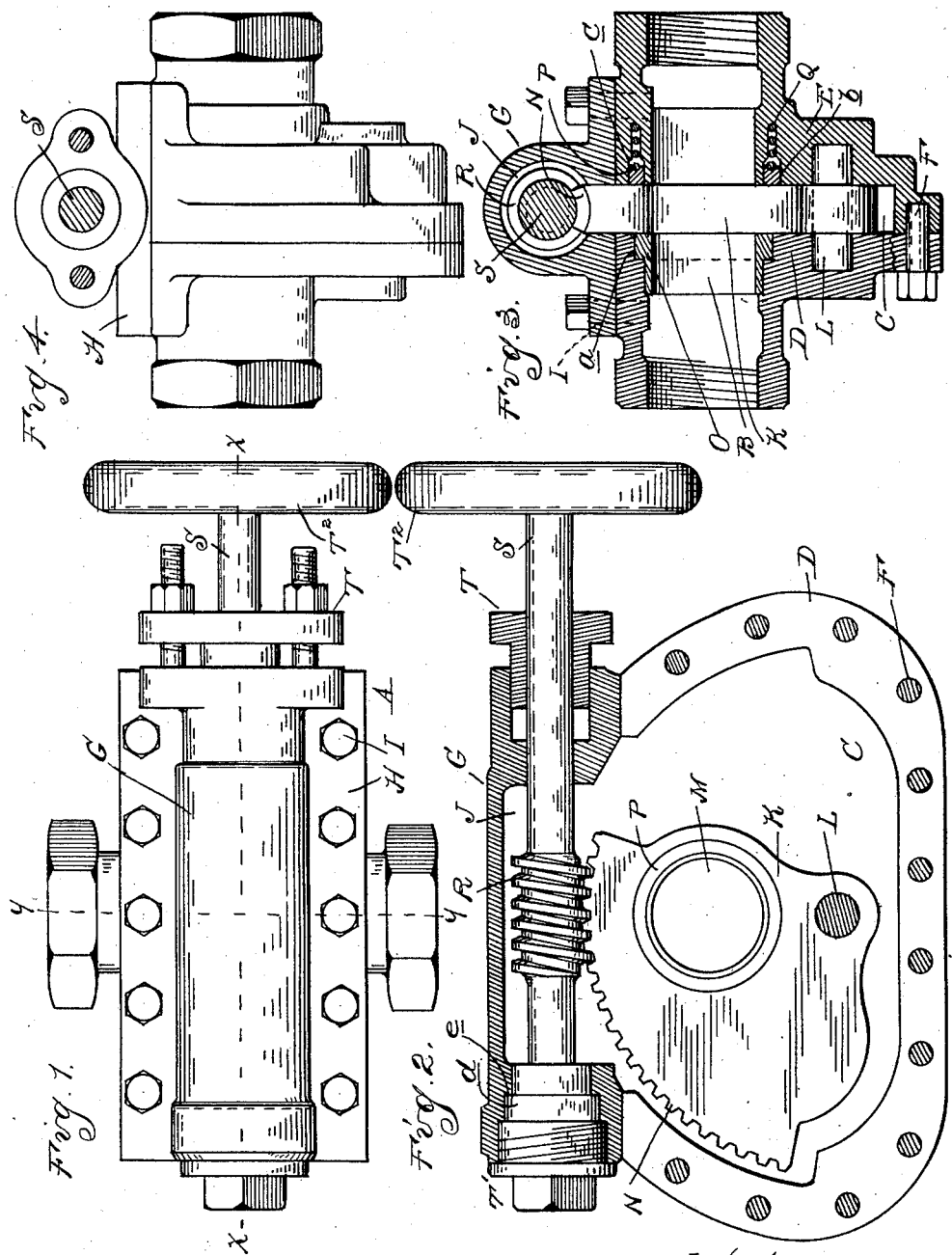

CHARLES W. WARD, OF HANCOCK, MICHIGAN.

VALVE.

1,002,948. Specification of Letters Patent. Patented Sept. 12, 1911.

Application filed October 31, 1910. Serial No. 590,004.

*To all whom it may concern:*

Be it known that I, CHARLES W. WARD, a citizen of the United States of America, residing at Hancock, in the county of Houghton and State of Michigan, have invented certain new and useful Improvements in Valves, of which the following is a specification, reference being had therein to the accompanying drawings.
The invention relates to a gate valve especially designed for use as a blow-off valve for steam boilers, and consists in the novel and simple construction thereof and in various details of construction and in their arrangements and combinations as more fully hereinafter set forth and claimed.

In the drawings,—Figure 1 is a top plan view of a valve mechanism embodying my invention; Figs. 2 and 3 are sections taken on lines $x$—$x$ and $y$—$y$ respectively of Fig. 1; and Fig. 4 is a side elevation.

In the drawings thus briefly described, A represents the valve casing formed with a horizontal passageway B extending therethrough and a valve chamber C projecting at right angles to the passageway as shown. In its preferred form the casing is composed of three sections,—two complementary members D and E united along their marginal lower edges by bolts, as F, and spaced one from the other to form the valve chamber referred to, and a cap section G provided with lateral marginal flanges H secured to the complementary sections, as by bolts I, and with a passageway J extending at right angles to the casing passage forming a housing to contain the operating parts for the valve.

Within the chamber C is located the valve K, in the form of a disk or plate, mounted upon a transverse pivot L for oscillating movement. An opening M is formed within the plate or valve disk, which registers with the passageway B, and a series of rack teeth as N are provided upon the upper marginal portion of the valve plate adapted preferably to project within the hollow J of the cap member. Seats are provided for the valve arranged one upon each side thereof, and are in contact with the disk or plate at all times and thus protected from the steam exhausting through the passageway.

O represents one of the valve seats in the form of a ring removably positioned within a recess $a$ in the casing member D, so as to contact with the valve disk. P is a complementary seat, preferably pressed constantly against the valve disk through the agency of a coil spring Q, the seat and spring being positioned in suitable recesses $b$ and $c$ in the casing member E. As thus constructed, both seats are constantly covered by the valve disk, whether the latter is in its open or closed position, and further through the action of the spring-pressed seat both seats are continuously in proper engagement with the valve, thus preventing any possible leakage of the steam.

The operating means for the valve disk is shown in the preferred form of a worm R upon an operating shaft S arranged within the housing of the casing for rotation and held against endwise movement. The shaft chamber is closed at one end by a suitable stuffing box, as T, and at the opposite end by a screw-plug T', while the shaft is provided at the end projecting through the stuffing box with a hand-wheel T². For holding the shaft against endwise movement a collar $d$ is formed thereon adapted to abut against a shoulder $e$ upon the cap member. The shoulder holds the shaft against movement in one direction, while movement in the other is prevented by the plug T'.

From the foregoing description it will be noticed that ease and effectiveness of operation is secured through the particular type of drive connection between the shaft and the valve, and the maximum leverage afforded the valve disk by the point of application of power thereto and the disk pivot being at a maximum distance apart. Attention is also directed to the fact that by reason of the removable cap forming a part of the casing access may be readily had to the interior of the latter for the purpose of lubrication or cleansing.

What I claim as my invention is,—

1. In a valve mechanism, the combination with an inclosing casing formed with a passageway therethrough, a valve chamber transverse to the passageway, and a shaft housing in the plane of the valve chamber communicating therewith, of an apertured disk constituting the valve pivoted within its chamber upon the side of the casing passageway opposite the shaft housing and projecting within the latter, a shaft within the housing operable from the exterior of the casing, and a drive connection between said shaft and the portion of the valve disk engaging the housing.

2. In a valve mechanism, the combination with an inclosing casing, having a passageway extending therethrough, composed of like adjoining sections spaced to form a valve chamber therebetween, and a removable cap section mounted upon and uniting the first-mentioned sections, said cap forming a shaft housing in the plane of the valve chamber and communicating therewith, an apertured disk valve pivoted within its chamber for movement into and out of registration with the casing passage, and an operating shaft within the housing for actuating the valve.

3. In a valve mechanism, the combination with an inclosing casing formed with a passageway therethrough, a valve chamber at substantially right angles to said passageway, and an open-ended shaft housing to one side of and communicating with the valve chamber, having an internal annular shoulder at one end thereof, of an apertured disk valve within this chamber pivoted for rocking movement having a series of teeth formed upon its periphery adjoining the housing, a screw plug, and a stuffing box for the housing ends, an operating shaft within the housing projecting through the stuffing box and provided with a collar abutting against the housing shoulder, limiting endwise movement of the shaft in one direction, and a worm upon said shaft engaging the teeth on the marginal portion of the shaft valve.

In testimony whereof I affix my signature in presence of two witnesses.

CHARLES W. WARD.

Witnesses:
   CORNELIUS T. HARRINGTON,
   MARGARET WARD.

Copies of this patent may be obtained for five cents each, by addressing the " Commissioner of Patents, Washington, D. C."